United States Patent
Sanson et al.

(10) Patent No.: US 7,512,179 B2
(45) Date of Patent: Mar. 31, 2009

(54) IMAGE CODING AND DECODING METHOD, CORRESPONDING DEVICES AND APPLICATIONS

(75) Inventors: Henri Sanson, Acigne (FR); Alexandre Buisson, Rennes (FR); Nathalie Laurent-Chatenet, Vignoc (FR)

(73) Assignee: France Telecom, Paris (FR)

( * ) Notice: Subject to any disclaimer, the term of this patent is extended or adjusted under 35 U.S.C. 154(b) by 921 days.

(21) Appl. No.: 10/470,316

(22) PCT Filed: Jan. 25, 2002

(86) PCT No.: PCT/FR02/00322

§ 371 (c)(1),
(2), (4) Date: Apr. 5, 2004

(87) PCT Pub. No.: WO02/060184

PCT Pub. Date: Aug. 1, 2002

(65) Prior Publication Data

US 2004/0151247 A1 Aug. 5, 2004

(30) Foreign Application Priority Data

Jan. 26, 2001 (FR) .................................. 01 01174

(51) Int. Cl.
*H04B 1/66* (2006.01)
*H04N 7/12* (2006.01)
*H04N 11/02* (2006.01)

(52) U.S. Cl. .................................. 375/240.12; 375/240

(58) Field of Classification Search ............ 375/240.12; 348/699
See application file for complete search history.

(56) References Cited

U.S. PATENT DOCUMENTS

| 4,383,272 | A |   | 5/1983  | Netravali et al. ............. 358/136 |
|-----------|---|---|---------|---------------------------------------|
| 5,654,771 | A | * | 8/1997  | Tekalp et al. ................. 348/699 |
| 5,838,827 | A |   | 11/1998 | Kobayashi et al. .......... 382/236 |
| 5,978,030 | A | * | 11/1999 | Jung et al. ............. 375/240.16 |
| 6,078,619 | A |   | 6/2000  | Monro et al. ................ 378/240 |
| 6,516,093 | B1 | * | 2/2003 | Pardas et al. ................. 382/243 |
| 6,668,091 | B1 | * | 12/2003 | Kim et al. .................... 382/243 |
| 6,898,320 | B2 | * | 5/2005 | Han et al. .................... 382/232 |
| 6,963,605 | B2 | * | 11/2005 | Laurent-Chatenet ........ 375/240 |

(Continued)

FOREIGN PATENT DOCUMENTS

EP           0 771 117 A2     5/1997

(Continued)

OTHER PUBLICATIONS

Celasun et al., "Optimal 2-D Hierarchical Content-Based Mesh Design and Update for Object-Based Mesh", IEEE Transactions on Circuits and Systems for Video Technology, vol. 10, No. 7, Oct. 2000.*

(Continued)

*Primary Examiner*—Tung Vo
*Assistant Examiner*—Anner Holder
(74) *Attorney, Agent, or Firm*—Westman, Champlin & Kelly, P.A.

(57) ABSTRACT

The invention concerns a method for coding images using selectively at least two image coding modes, each optimising compression of at least a video sequence image on the basis of different optimisation criteria.

25 Claims, 5 Drawing Sheets

U.S. PATENT DOCUMENTS 6,999,629 B1 * 2/2006 Lechat et al. .............. 382/240

FOREIGN PATENT DOCUMENTS

GB 2 279 531 A 1/1995
WO WO 97/39577 10/1997

OTHER PUBLICATIONS

P.N. Tudor, "MPEG-2 Video Compression Tutorial", The Institution of Electrical Engineers(IEE), 1995, pp. 2/1-2/8.

Rob Koenen, "Overview of the MPEG-4 Standard", ISO/IEC JTC1/SC29/WG11, Dec. 1999/Maui, pp. 1-57.

J. Niewcglowski et al., Motion Compensated Video Sequence Interpolation Using Digital Image Warping, IEEE, Apr. 19, 1994, pp. V-205-V-208.

P. Lechant and Henri Sanson, "Combined Mesh Based Image Representation and Motion Estimation, Application to Video Coding", IEEE, Oct. 4, 1998, vol. 2, Conf. 5, pp. 909-911.

R. Depommier and E. Dubois, "Motion Estimation with Detection of Occlusion Areas", IEEE, 1992, vol. 3, Conf. 17, pp. III-269-III-271.

N. Laurent, "Hierarchical Mesh-Based Global Motion Estimation, Including Occlusion Areas Detection", IEEE, 2000, vol. 3, pp. 620-623.

Examiner's Report from Canadian Intellectual Property Office concerning corresponding Canadian Patent Application No. 2,435,933. (Sep. 24, 2007).

* cited by examiner

IMAGE CODING AND DECODING METHOD, CORRESPONDING DEVICES AND APPLICATIONS

CROSS-REFERENCE TO RELATED APPLICATION

This Application is a Section 371 National Stage Application of International Application No. PCT/FR02/00322 filed Jan. 25, 2002 and published as WO 02/060184 on Aug. 1, 2002, not in English.

FIELD OF THE INVENTION

The technical domain of the invention is that of encoding by reducing the bit rate of animated image sequences, particularly video.

BACKGROUND OF THE INVENTION

There are a great number of video encoding applications. These include (list not exhaustive):
Digital TV transmission
Real-time video transmission on several types of networks: IP, mobile, ("Streaming IP")
Computer storage of video The invention is applicable, in particular, within the framework of systems that implement MPEG-type encoding. MPEG-type encoding means encoding based on temporal prediction and discrete cosine transformation based on a hard block structure, often with a fixed size, but possibly with variable size. The two representative standards for this encoding family are the MPEG-4 standards of versions 1 to 4 and ITU-T/H.263 up to version 2. The invention can also be applied within the framework of the CCITT H26L recommendation (for example, see corresponding VCEG-N83d1 document).

The video encoding and decoding diagrams currently offered are divided into 2 categories:
Encoding standardised by either ISO/MPEG, or by ITU-T, all based on the same type of techniques (temporal prediction and discrete cosine transformation based on a block structure)
Encoding under development offered by research laboratories that invoke a large panel of techniques: wavelet encoding, regional encoding, fractal encoding, meshing encoding, etc.

Currently, MPEG-4 encoding is considered the trade standard, not only in standardised encoding, but also in terms of published encoding.

MPEG-4 or ITU-T/H.263++ type encoding is considered as having reached its limitations, in particular due to the fixed-size hard block structure used as support for all encoding calculations and operations. In particular, the temporal prediction of images within a sequence is not sufficiently exploited.

Furthermore, published alternative encoding has not yet achieved a sufficient degree of optimisation.

Therefore, to allow encoded video sequences at low bit rates to be obtained, encoders normally reduce the size of images and create temporal subsamples of the original video sequence. Nevertheless, the second technique has the inconvenience of restoring erratic movements that are more or less problematic for the user depending on the subsample level.

To avoid these erratic movements, the missing images (unencoded) must be regenerated in the decoder using temporal interpolation.

Nevertheless, current techniques for the temporal interpolation of images do not allow satisfactory results to be obtained, particularly when they are implemented in a single decoder. Indeed, these techniques are the source of visual artefacts related to the movement compensation techniques based on blocks that only define a single movement vector for all the pixels of a block.

The purpose of the invention specifically is to remedy the limitations of previous techniques.

More precisely, one objective of the invention is to provide a technique for encoding and decoding image data, which allows a reduced bit rate and/or improved regenerated image quality to be obtained with respect to known techniques.

BRIEF SUMMARY OF THE INVENTION

This objective is achieved, according to the invention, with the help of an image encoding procedure that selectively implements at least two methods of image encoding, each optimising the compression of at least one video sequence image depending on the various optimisation criteria.

According to several beneficial embodiments, information regarding the choice of one of the said encoding modes of a decoder may be known to a decoder according to at least one of the techniques that belong to the group comprising the following:
predefined choice, known at the encoding and decoding level;
representative information of the choice included in the data flow comprising of at least some encoded image data;
representative information of the choice included in the data flow regardless of the encoded image data;
determination of choice in predefined manner by the decoder.

Beneficially, the procedure involves a phase for selecting an encoding mode to apply to said image, which includes at least:
an initial encoding that optimises the photometric representation of an image.
a second encoding that optimises a representation of the movement between at least two images.

As such, the present invention involves a new video encoding procedure by encoding hybridisation, in particular, MPEG-type encoding and encoding using temporal interpolation based on a representation by meshing, as well as the decoding procedure and the structure of the associated binary representation.

Preferably, said second encoding takes into account at least one previous image and/or at least one subsequent image encoded using the first said encoding.

Beneficially, said second encoding takes into account a movement vector field calculated from the immediately preceding image encoded using said initial coding and/or a movement vector field calculated from the immediately subsequent image encoded using said initial coding.

Beneficially, these movement vector fields are applied to the meshing.

In this case, said vector movement fields can be used to determine a reduced movement vector field, associated with an image encoded using said second encoding.

According to a preferential embodiment of the invention, said selection phase is based on the implementation of an N fixed factor subsample, an image on N being encoded using said initial encoding.

Beneficially, this N value is variable, depending on at least one predefined criterion.

According to a specific embodiment, said initial encoding implements a transformation on image blocks and a temporal prediction by blocks. This transformation is, for example, a DCT-type transformation, Hadamard transformation, wavelet transformation, etc.

In will be observed that the image blocks are not necessarily square, but can take on any form adapted to the needs and means available.

This initial encoding can, in particular, be MPEG-4 or H26L encoding.

In the case of the latter, it is preferable to use type I (intra) images and/or type P (predictable) images (and not, preferably, type B images).

According to another particular aspect of the invention, said second encoding is based beneficially on the implementation of an M-level hierarchical meshing, where M is greater than or equal to 1, and, for example, triangular meshing.

In this case, the procedure preferably involves a management phase of the occlusion areas, or blanking areas.

The data produced can be grouped into a single flow. Beneficially, at least two data flows that can be transmitted on independent transmission paths can be expected.

Beneficially, said data flows belong to the group that comprises:
a global header;
image data encoded according to said initial encoding;
image data encoded according to said second encoding.

Flow transmission can therefore take place independently. In particular, this allows progressive and/or partial decoding of images, depending on means and needs.

Therefore, according to a particular embodiment of the invention, the following aspects are exploited:
Optimisation driven by constitutive modules of standardised MPEG or ITU-T/H.263-type encoding
Powerful temporal prediction and related error encoding for meshing-based techniques.

Indeed, the meshing-based approach helps avoid the effects of normal blocks thanks to the use of continuous movement fields. Furthermore, the meshing technique allows blanking "objects" to be detected, as well as error encoding that is properly adapted to these areas. In addition, by combining MPEG-type error encoding around these areas, the efficiency of interpolation can be substantially improved at a cost much lower than that of the bi-directional images (type B images) offered by MPEG.

Therefore, basic information can be efficiently encoded with low temporal resolution using MPEG-type encoding, with good quality, and the full flow of the sequence can then be restored using encoding in interpolated mode by meshing.

The invention also involves, of course:
procedures for decoding an image signal encoded using the encoding procedure described above;
procedures for encoding an image signal encoded using the encoding procedure described above;
devices for decoding an image signal encoded using the encoding procedure described above (including, beneficially, means for determining at least part of a vector field and/or at least a part of the blanking areas, similar to those implemented during encoding;
devices for storing at least one image signal encoded using the encoding procedure described above
encoding, transmission and/or decoding systems of an image signal encoded using the encoding procedure described above (the choice of one of the said encoding modes may be known beneficially to a decoder according to at least one of the techniques that belong to the group, comprising the following:
predefined choice, known during encoding and decoding;
representative information of the choice included in a data flow comprising at least some of the encoded image data;
representative information of the choice included in a data flow regardless of the encoded image data;
determination of the choice in an intrinsic manner, by the decoder;
the computer program products for encoding and/or decoding of an image signal encoded using the encoding procedure;
data support for such a program.

The invention also involves image data signals comprising encoded data according to the procedure described above.

Beneficially, this signal comprises at least one indicator that specifies whether the procedure has been activated or not.

Preferably, the signal comprises data that specifies the frame structure, at the beginning of the video sequence and/or at each signal frame.

Beneficially, a sequence that is encoded using said second encoding begins with a header that indicates the number of frames encoded according to this second encoding.

According to a specific embodiment, the signal comprises at least two data flows, which can be transmitted on separate transmission paths.

In this case, said data flows belong beneficially to the group comprising:
a global header;
image data encoded according to said initial encoding;
image data encoded according to said second encoding.

The invention finds applications in various domains and, in particular, in domains belonging to the group comprising:
digital TV;
real-time video over IP network;
real-time video over network to mobiles;
image data storage.

BRIEF DESCRIPTION OF THE DRAWINGS

Other features and advantages of the invention will be more evident on reading the description of a preferential embodiment of the invention, provided as a simple illustrated, non-limiting example, as well as the drawings attached in which.

DETAILED DESCRIPTION OF PREFERRED EMBODIMENTS

The embodiment of the invention described below essentially consists in the hybridisation of MPEG-type encoding, for example MPEG-4, using meshing encoding that operates in interpolated mode, also called B mode or B images in the MPEG standards.

It should be noted that the MPEG-4 encoding mentioned here can be replaced by any encoder based on equivalent techniques, that is, using a temporal prediction and discrete cosine transformation based on a block structure, and quantifications and entropic encoding for the generated information. In particular, ITU-T/H.263++ encoding can be substituted for MPEG-4 encoding.

For each image of the sequence coming into the encoder, the encoder decides according to a specific decision-making process (for example, fixed factor temporal subsampling) of the encoder with the MPEG-4 encoding module, or with the meshing-based encoding module.

The images encoded in meshing mode use, as a reference for their temporal prediction, images encoded in MPEG-4 mode located immediately before or immediately after the group of images encoded in meshing mode to which they belong.

The key point of the compression efficiency of the invention is that the meshing-based movement compensation leads to a very powerful temporal prediction, with a very low associated encoding cost.

Indeed, this technique:

Takes into account various types of movement within the images.

Specifically processes the covering and uncovering of areas due to the movement of objects.

Figure 1:
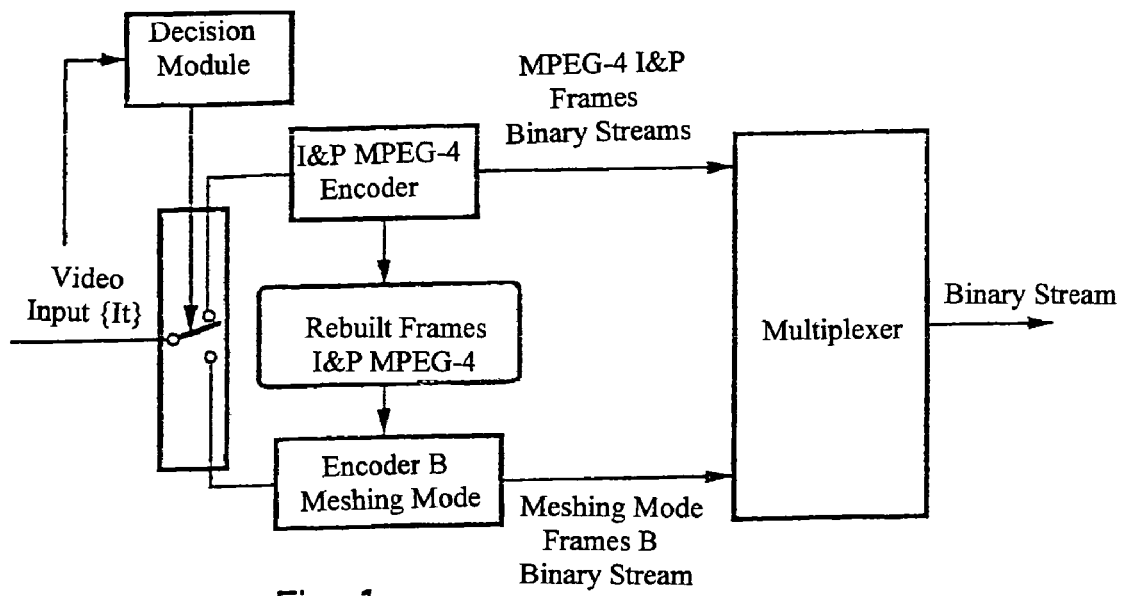
FIG. 1 is a schematic diagram of the encoding of the invention.

FIG. 1 provides an overview of the principle of the encoder.

First, incoming images are directed to either the MPEG encoding module or the meshing-based encoding module, according to a given decision method, for example, according to a predefined rhythm: 1 image in N is encoded in MPEG, the rest are encoded in meshing interpolated mode. It is noted that $N_k$ represents the number of images encoded in MPEG mode.

All the other $I_k N_k < 1 < N_{k+1}$ images are encoded by a meshing based encoder, for example triangular, that operates in interpolated mode, called B mode. The general principal of this encoder is as follows:

1. Calculation of before and after movement fields between $N_k$ and $N_{k+1}$ images. These fields are modelled in the form of triangular meshings.

2a. Estimation of predictable areas: during interpolation, the movement between It and It' is estimated. If the movement vector application does not lead to a conversion (which means that one is in the presence of a predictable area), movement compensation is performed by weighting the vectors using $k(0 \leq k \leq 1)$ scalar in order to interpolate $I_{t+k}$ with t+k belonging to ]t, t'[. There are three possible approaches to movement compensation, as described below.

2b. Estimation of non-predictable areas: detection of non-predictable blanking areas, in Il images to be encoded, from the awareness of these movement fields.

3. Specific encoding of these blanking areas according to one of the following three possible modes:

Prediction with one of the reference images ($N_k$, $N_{k+1}$, or these images compensated during movement with their movement fields) without movement compensation, then encoding the prediction error with a triangular meshing-based technique.

Prediction with one of the reference images ($N_k$, $N_{k+1}$, or these images compensated during movement with their movement fields) with intra-image movement compensation, then encoding the prediction error with a triangular meshing-based technique.

Intra-image encoding based on a triangular meshing-based technique

4. Optionally, mode P MPEG-type encoding of the residual prediction error or encoding, limited to an area around the blanking area.

As mentioned above, movement compensation can be performed using three approaches: with an estimate before, with an estimate after or with an estimate before and an estimate after.

1) with an estimate before:

During interpolation, the movement between $I_{t1}$ and $I_{t2}$ is estimated. If the movement vector application does not lead to a conversion (which corresponds to the predictable areas), then movement compensation is performed by weighting the vectors with $k=m/(t1+t2)$ $(0<k<1)$ scalar in order to interpolate Im with m belonging to [t1, t2]. The El1 estimated image is obtained.

2) with an estimate after:

During interpolation, the movement between $I_{t2}$ and $I_{t1}$ is estimated. If the movement vector application does not lead to a conversion (which corresponds to the predictable areas), then movement compensation is performed by weighting the vectors with $k'=1-m/(t1+t2)$ $(0<=k'<=1)$ scalar in order to interpolate Im with m belonging to [t1, t2]. The E2 estimated image is obtained.

3) both together:

During interpolation, the movement between $I_{t1}$ and $I_{t2}$ and between $I_{t2}$ and $I_{t1}$ is estimated. If the movement vector application does not lead to a conversion (which corresponds to the predictable areas), then movement compensation is performed by weighting the "before" vectors with $(0<=k<=1)$ scalar, and E1 is obtained. The same is done with the "after" vectors using the k' $(0<=k'<=1)$ scalar, and E2 is obtained. The estimated image is then $E=aE1+(1-a)E2$ with $(0<=a<=1)$.

Every 2 bits, the best solution is taken after calculating the PSNR between the estimated solution and the related source image.

1. Calculating Before and After Movement Fields Between $N_k$ and $N_{k+1}$ Images The before and after movement fields between $N_k$ and $N_{k+1}$ images are calculated, in the form of hierarchical meshing, for example triangular, $T^b_k$ and $T^b_{k+1}$ as indicated in FIG. 2.

These meshings are obtained by dividing certain meshes, for example, triangular meshes are divided into 4 sub-triangles, according to a specific criterion during the movement estimation process. At each hierarchical level, division decisions are taken or not for each mesh. Once these divisions have been decided upon, the adjacent meshes of the divided meshes are divided in order to maintain a uniform meshing structure. The initial meshing, before division (top of the hierarchy) can take any form.

Figure 2:
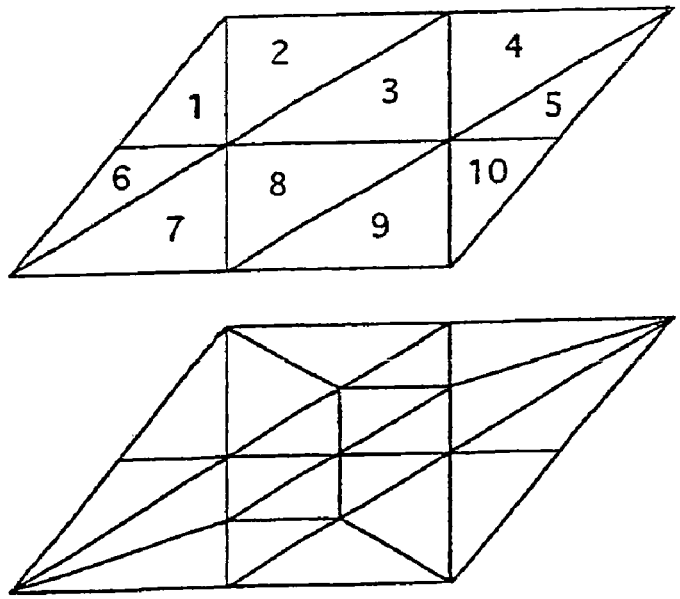
FIG. 2 illustrates an example of the hierarchical meshing structure for the movement.
Figure 3:
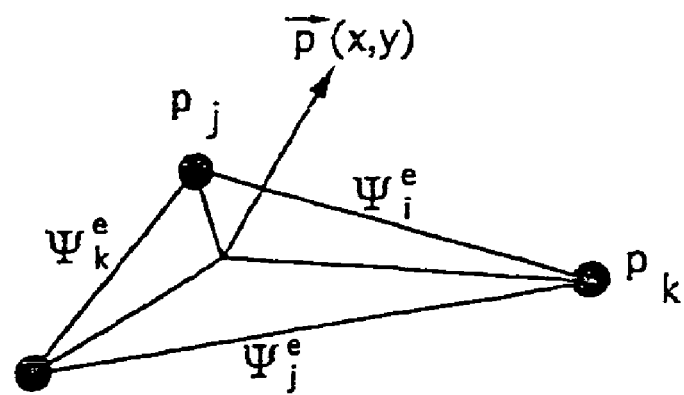
FIG. 3 illustrates the affine interpolation principle on a triangular mesh.

In the example in FIG. 2, the movement estimator decides to divide triangles 3 and 8. This leads to the division of triangles 2, 4, 7, and 9. The process is repeated up to a predefined hierarchy level.

In the case of triangular meshings, the movement field expression defined by the triangular meshing T is given for each triangle e by:

$$\vec{d}(\vec{p}, D) = \sum_{\{ver(e)\}} \psi_n^e(\vec{p})\vec{d}_n \quad \forall \vec{p}(x,y) \in e$$

where:
e indicates the triangular element of T containing the current point $\vec{p}$ of the x and y coordinates
{ver(e)} indicates all three nodes or peaks, numbered i, j, k of positions $\vec{p}_i$, $\vec{p}_j$, and $\vec{p}_k$
$\Psi_1(l=i,j,k)$ represents the barycentrical coordinates of point $\vec{p}$ (x,y) in the $e_{i,j,k}$ triangular element with:

$$\begin{cases} \Psi_l^e(x,y)=\alpha_l^e+\beta_l^e x+\gamma_l^e y, \alpha_l^e, \beta_l^e, \gamma_l^e \in R \\ \sum_{l=i,j,k} \Psi_l^e(x,y) = 1 \quad \text{if } \vec{p}(x,y) \in e_{i,j,k} \\ \Psi_l^e(x,y) = 0 \qquad \text{otherwise} \end{cases}$$

This type of model defines a fully continuous field. Furthermore, it allows full control of representation accuracy, an essential feature for compression.

At each level of the meshing hierarchy, nodal movement vectors are calculated in order to minimise prediction errors. Various meshing-based movement estimators can be used, for example those described in patent FR No. 98 11227, or FR No. 99 15568.

The important point to remember is that the final meshing is the result of a hierarchical process from the initial meshing by divisions. This hierarchical nature is indeed used to advantage for the differential encoding of nodal movement vectors between a node and its parent nodes (the edges of the arc in which it is inserted). The meshing structure is recalculated in the decoder using the knowledge from the initial meshing, as well as the mesh division indicators.

Therefore, at the end of the process, 2 movement meshings are obtained for each group of images comprised of $N_k$ and $N_{k+1}$ images used to regenerate all the images of the group.

2. Detection of Blanking Areas

From these 2 meshings, the blanking areas occlusions, that is the non-predictable areas in the $N_k$ image obtained from the $N_{k+1}$ image or vice versa, from the covering or uncovering of objects, are detected.

These areas are simply defined by the covering of triangles after they have been moved by their nodal vectors.

The figure illustrates the basic blanking detection on the uncovering of triangles after movement.

The encoder can continue the movement estimate by deactivating the triangles in the blanking areas, in order to obtain movement vectors that are less biased.

Nevertheless, this is strictly an internal feature of the encoder's strategy, and at the end, it is the two $T^b_k$ and $T^f_{k+1}$ complete movement meshings that are encoded and inserted in the binary stream. The decoder is then able to find the blanking areas using these 2 meshings.

These blanking areas are defined in the $N_k$ and $N_{k+1}$ images and once they are detected, their corresponding triangles are labelled as a result, both in the encoder and in the decoder.

Nonetheless, the encoder must know where these areas are found in the $N_k+1$ and $N_{k+1}-1$ images. These images are simply obtained by projecting the $T^b_k$ and $T^f_{k+1}$ meshings on the image to be encoded by applying nodal movement vectors that are renormalized to take into account the temporal distance between the current image and the reference $N_k$ or $N_{k+1}$ image.

3. Blanking Area Encoding:

For each blanking area, the reference image for a possible prediction is selected among $I_{Nk}$, $I_{N(k+1)}$, as well as $I^c_j$, which is the image obtained at l, by movement compensation with the $T^b_k$ or $T^f_{k+1}$ meshing, at a level in which there is as yet no mesh covering.

More precisely, the choice between $I_{Nk}$ and $I_{N(k+1)}$ simply depends on the $T^b_k$ or $T^f_{k+1}$ meshing that generated the current blanking area. Then, this meshing is used to predict the image and provide $I^c_j$. The choice between $I^c_j$ and $I_{Nk}$ or $I_{N(k+1)}$ is based on a prediction error criterion: the image causing the weakest error is maintained. Therefore, it is simply a matter of inserting 1 bit in the binary flow, per area, to encode the choice of the prediction that was maintained.

Take not of I, the selected reference image.

The rest of the encoding of these areas includes 2 stages:
A prediction stage.
An encoding stage of the prediction error or of the original texture in the case of an incorrect prediction.

3.1 Residual Prediction of the Blanking Area Texture

Three methods can be used, in an exclusive manner. The decision is based on the lowest error criterion.

Method 1:
The values Y, U and V of a pixel in the area are simply those of the pixel located in the same reference image $I_1$. That is, $\hat{I}_1$ the resulting image. The prediction error between $\hat{I}$ and I1 is then encoded.

Method 2:
A movement estimate is therefore performed between $I_1$ (the image to be encoded) and $\hat{I}_1$ (the result of the prediction from method 1) on the blanking area. The resulting meshing, that stems from the last meshing level $T_r$, r=k or k+1, before the meshes are covered, is therefore encoded as are its nodal movements. Lastly, the residual prediction error is encoded according to a procedure defined later.

Method 3:
No prediction is performed and the original values of the area's pixels are encoded.

4. Encoding the Texture or Prediction Error of Blanking Areas.

The original texture and prediction error undergo the same encoding, for which the principle is as follows:

It is assumed that an initial triangular meshing was able to be defined from the $T_r$ meshing movement maintained for the prediction of the area to be encoded. The way of obtaining this initial meshing will be described later.

The texture is therefore approximated on each mesh according to a choice:
Meshes with many high frequencies are encoded based on the transformation by discrete cosine called DCT.
The smoother meshes are encoded using a refined model of finished elements.

Again, a hierarchical approach will be used to reduce the cost of encoding the representation through meshing.

The approach used allows the low cost of encoding related to a regular hierarchy of meshes to be maintained whilst permitting local adaptation of image contents that the irregular decomposition of meshes allows.

From the thick initial meshing of the area, meshes are subdivided into 4 triangular sub-meshes up to a given level.

On the last level, an optional permutation of the quadrilateral diagonals generated by 2 adjacent triangles can be implemented, if this results in a reduction of the approximation error.

4.1 Initialisation of Texture Meshing on Blanking Areas

This meshing is simply given by the last $T_r$ level (meshing resulting from the movement of $T_k$ or $T_{k+1}$ depending on the direction maintained) before the conversions appear in the area under consideration. Therefore, a texture meshing that is inserted naturally into the movement meshing is obtained, because it is extracted from the latter.

4.2 Representations Used for the Texture on Triangles

Two representations are combined: affine interpolation and triangular 4 DCT

Affine Interpolation

The triangular meshing nodes contain the photometric (colour, error) information and interpolation for the points inside the triangle is performed by a Lagrange finished element, also called affine interpolation.

The $v(\vec{p})$ value of point $\vec{p}$ (x,y) inside the triangle $e_{i,j,k}$ defined by the 3 nodes $\vec{p}_l, l=i,j,k$ is provided by the following equation:

$$v(\vec{p}) = \sum_{l=i,j,k} \psi_l^e(x,y)\vec{p}_l$$

where $\Psi_l (l=i,j,k)$ represents the barycentrical coordinates of the point.

$v(\vec{p})$ can be one of the Y, U, or V photometrical components of the point or the prediction error for these components.

Several methods can be used to calculate the nodal values, in particular, the method of lesser squares.

Discrete Cosine Transformation (DCT) on Triangles

The principle of the method consists in transforming any triangle into a rectangular isosceles reference. The content of this triangle is therefore rendered symmetrical with respect to the hypotenuse to provide a symmetrical square matrix (FIG. 4).

A classic DCT (square) is therefore applied to this matrix. It can be shown that the transformed matrix is also symmetrical. Only the coefficients of its lower triangle are therefore quantified then statistically encoded (entropic encoding).

Figure 4:
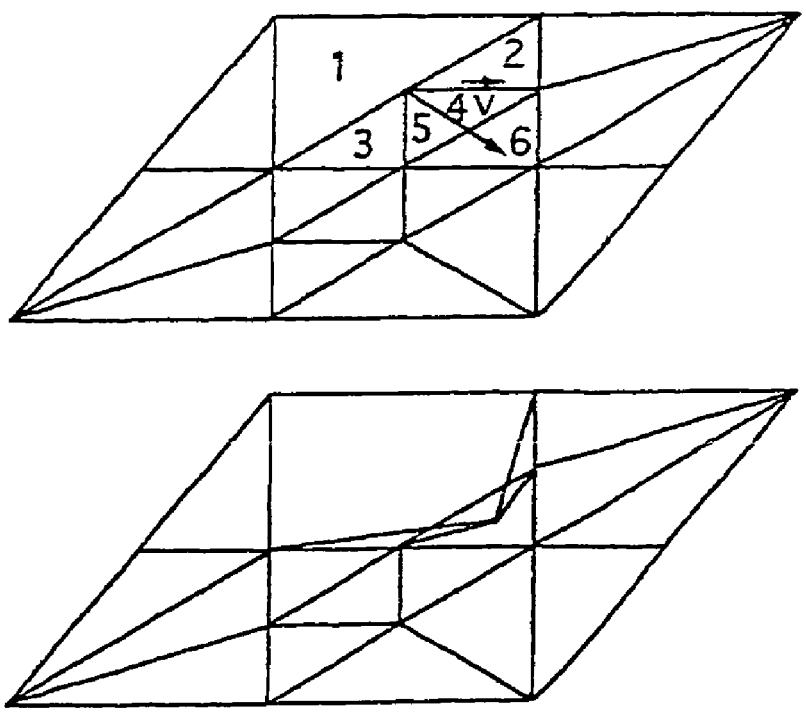
FIG. 4 is an example of blanking detected by covering triangles.

FIG. 4 describes the various stages of the process: selection of the T triangle, affine transformation of the T triangle into a T' rectangle isosceles triangle. Through affine transformation, the triangle pixels are no longer located on a regular orthogonal graph, and resampling of the photometric values inside the reference triangle is recommended. To do so, a process similar to the process for movement compensation in the image (during affine transformation) is used, using an interpolator, for example bilinear.

The affine transformation F and its inverse $F^{-1}$ are defined by the following equations:

$$F: \begin{cases} X = \dfrac{(x_2-x_1)(y_1-y)+(y_1-y_2)(x_1-x)}{(x_3-x_1)+(y_2-y_1)+(y_1-y_3)(x_2-x_1)}N \\ Y = \dfrac{(x_1-x_3)+(y_1-y)+(y_3-y_1)(x_1-x)}{(x_3-x_1)(y_2-y_1)+(y_1-y_3)(x_2-x_1)}N \end{cases}$$

-continued $$F^{-1}: \begin{cases} x = x_1+(x_3-x_1)\dfrac{X}{N}+(x_2-x_1)\dfrac{Y}{N} \\ y = y_1+(y_3-y_1)\dfrac{X}{N}+(y_2-y_1)\dfrac{Y}{N} \end{cases}$$

The photometric values M(i,j) of the T' triangle (therefore of the M block rendered symmetrical of T') are obtained by the $F^{-1}$ inverse transformation, and then the $\Gamma$ interpolation of the texture of the image to encode:

$$M(i_y, j_x) = I_\Gamma(P_{(x,y)}) = I_\Gamma(F^{-1}(Q_{(x,y)}))$$

where:

the $M(i_y, j_x)$ coefficient is the value at the $Q^{(X,Y)}$ point where the transformed $P^{(x,y)}$ is $F^{-1}(Q)$ $I_\Gamma$ indicates the interpolater used to calculate the images value at the point, the coordinates that are potentially non-itegers.

$I_\Gamma$ indicates the inerpolater used to calculate the image value at the point, the coordinates that are potentially non-integers.

The $\hat{\Gamma}$ regeneration of the $\Gamma$ texture is given by:

$$\hat{\Gamma}(P_{(x,y)}) = I_{\hat{\Gamma}}(Q_{(x,y)}) = I_{\hat{\Gamma}}(F(P_{(x,y)}))$$

where $I_{\hat{\Gamma}}$ indicates the interpolated texture from the M' block values, a quantified version of M.

This technique can only be applied to non-null area triangles. But, by definition, this type of triangle does not need texture encoding.

Contrary to SADCT (DCT adapted to a form), this transformation does not guarantee the perfect regeneration after inverse transformation, even if there is no quantification.

In order to reduce regeneration errors, a scale factor $\alpha$ is introduced to calculate the $M_i$ block (size $N_i \times N_i$) for triangle i:

$$N_i = E(\alpha\sqrt{2A_i})$$

where:

E is the complete part by excess, $A_i$ is the triangle i area.

In fact, $\alpha=1$ provides for an interesting compromise, which is more effective for triangles that are close to an isosceles. The case $\alpha<1$ is used in conjunction with the quantification step to compress the information volume.

Once the Mi block is defined for each triangle, a classic DCT transformation is applied to them, and the transformed coefficients are quantified according to several possible procedures, for example, uniform scalar quantification, or even incremental quantification with the frequency of the transformed coefficient. The use of well known MPEG or JPEG quantification matrices is also possible.

The DCT expression is given by:

$$F(u,v) = \dfrac{1}{\sqrt{NM}} \sum_{i=0}^{N-1} \sum_{j=0}^{M-1} \lambda(u)\lambda(v)\cos\dfrac{(2i+1)u\pi}{2N}\cos\dfrac{(2j+1)v\pi}{2M} f(i,j)$$

$$\lambda(\xi) = \begin{cases} \dfrac{1}{\sqrt{2}} & \text{if } \xi = 0 \\ 1 & \text{otherwise} \end{cases}$$

The F(u,v)=F(v,u) relationship is present because:

f(i,j)=f(j,i) ($\forall u,v,i,j=0,\ldots,N-1$) by definition.

As a result, it is enough to calculate only the coefficients of the lower part of the transformed matrix.

4.3 Global Encoding of Texture

Figure 5:
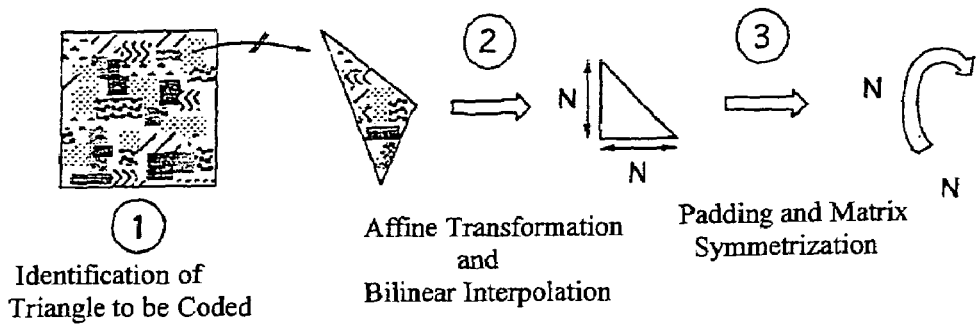
FIG. 5 illustrates the transformation process of any image triangle in a symmetrical square matrix.
Figure 6:
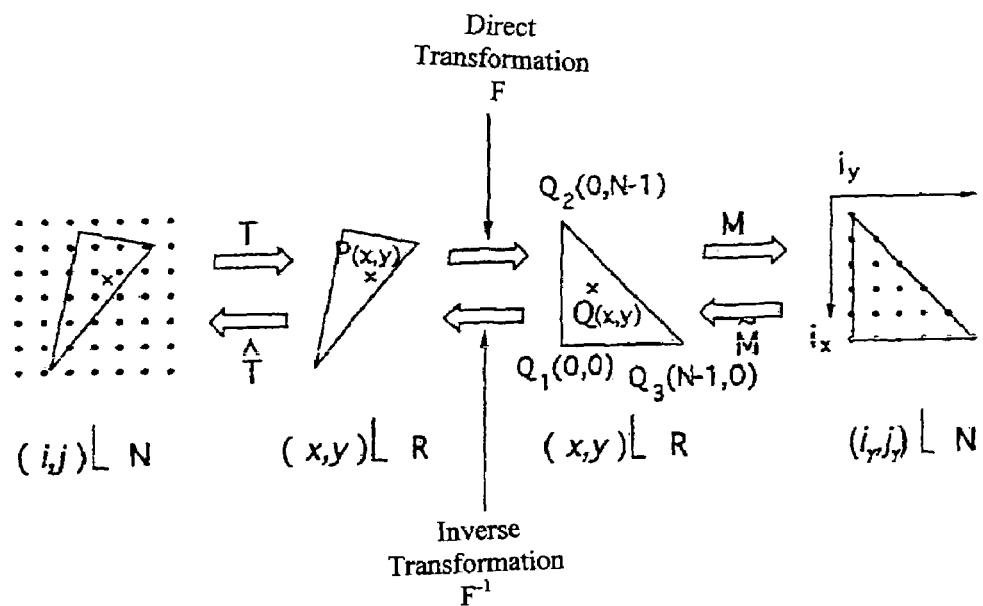
FIG. 6 illustrates the transformation of any triangle into a rectangle isosceles triangle.
Figure 7:
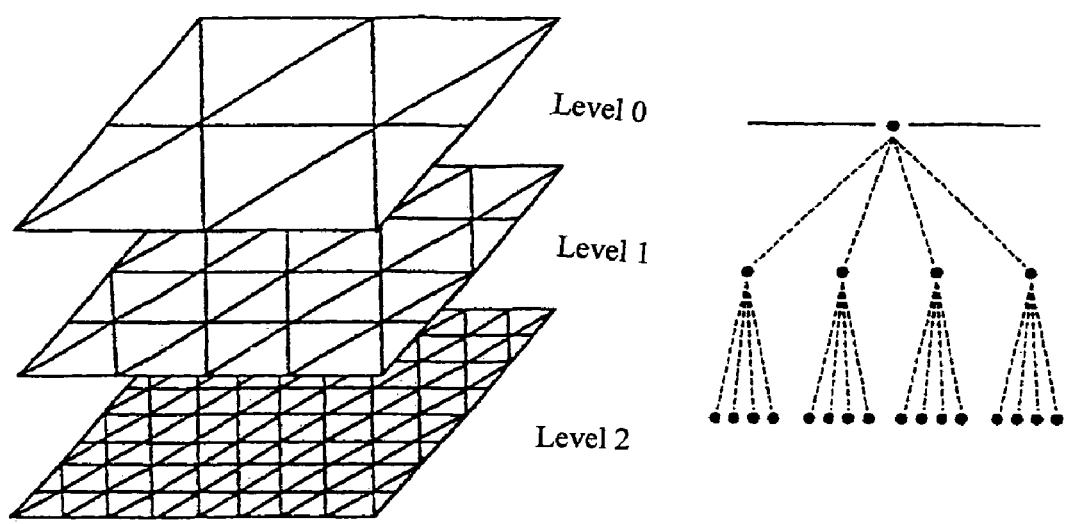
FIG. 7 illustrates a hierarchical meshing and representation by the related quaternary tree.

As previously indicated, a uniform hierarchical meshing is used which is obtained by dividing each triangle of a given level of the hierarchy into 4 sub-triangles, and inserting nodes in the middle of the arcs. The process is repeated until the maximum level is reached. This hierarchy of triangles is also represented and managed by the encoder in the form of a quaternary tree (FIG. 5). Note that only the triangles included in the area to encode are taken into account. The construction procedure of the basic initial meshing guarantees that all the triangles of the meshing hierarchy belong to the area to encode.

The encoding process by meshing a blanking area can be summarised as follows:

1. An interleaved hierarchical meshing is defined on the area to encode by creating a regular initial meshing and then repeatedly subdividing triangles into 4 sub-triangles and inserting new nodes in the middle of the arcs. The node values are calculated in order to minimise the approximation error of the area due to meshing.
2. The pixel values are moved closer together using affine interpolation on the triangle that contains the pixels using the node values.

For each triangle in the hierarchy, the approximation error E is evaluated and then the various representation and encoding methods are decided upon based on 2 thresholds: $\sigma_1$ and $\sigma_2$:

1. if $E<\sigma_1$, affine interpolation on the triangle is sufficient.
2. If $\sigma_1<E<\sigma_2$, the thinnest decomposition of the triangle must be used to obtain a good approximation, always using affine interpolation.
3. if $E>\sigma_2$, the triangle is textured and the affine interpolation error is encoded using DCT.

Lastly, on the thinnest meshing, the reduction of the error produced by the permutation of the quadrilateral diagonals formed by 2 adjacent triangles is tested. If a positive result is obtained, this permutation is validated.

According to the encoding methods chosen for the different triangles, the various data are encoded in the following manner.

The YUV nodal values are first predicted using the values of the parent nodes (edges of the arc where the current node is inserted). The difference between the node value and its predicted value is therefore quantified.

Lastly, the quaternary tree structure (including the division and non-division indicators of the triangles), the diagonal permutation indicators, the differential nodal values of YUV and the quantified DCT coefficients are encoded using an arithmetic encoder and inserted in the binary stream.

5. Summary of Encoded Information in the Binary Flow of Frames Encoded by Meshing Each group of frames encoded in meshing mode between $N_{k+1}$ and $N_{k+1}-1$ (where $N_k$ $N_{k+1}$ are the preceding and subsequent frames, respectively, encoded in MPEG mode) is represented as a whole in the binary flow.

The driven data comprises, in encoded form:

A header for the set of frame groups, including, among others, the real number of encoded frames.

The movement meshings (structure and movement vectors of nodes) $T^b_k$ and $T^f_{k+1}$.

The prediction or original error texture, for each image of the group.

6. Global Structure of the Binary Stream

Figure 8:
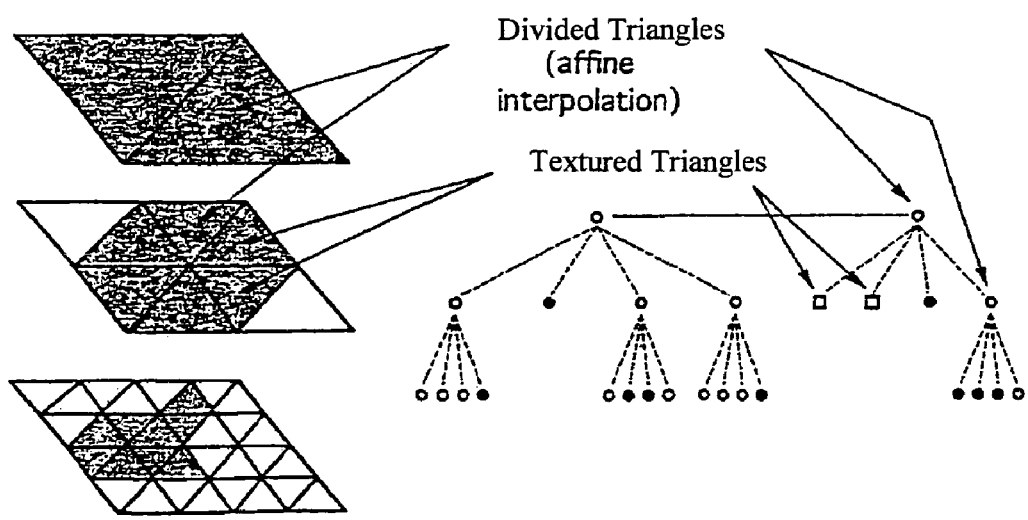
FIG. 8 is an example of an encoding decision for the hierarchical meshing.

The global binary stream comprises a succession of frames encoded in MPEG mode and groups of frames encoded in meshing mode, as indicated in FIG. 8.

The global header of the binary stream that represents the encoded sequence contains, among others, the indication of the hybrid encoding.

The part of the binary stream that corresponds to a group of frames encoded in meshing mode begins with a header that indicates, among other things, the number of frames actually encoded, and may be null.

The various data flows (binary streams) that correspond, respectively, to the global header of the encoded sequence, the images encoded in MPEG and the groups of i images encoded in interpolated meshing mode can be sent through different, independent paths if required. In particular, the encoding procedure allows hierarchical (or scalable) encoding of the sequence, that is, decoding that only uses a part of the total bit rate.

7. Decoding Procedure

Figure 9:
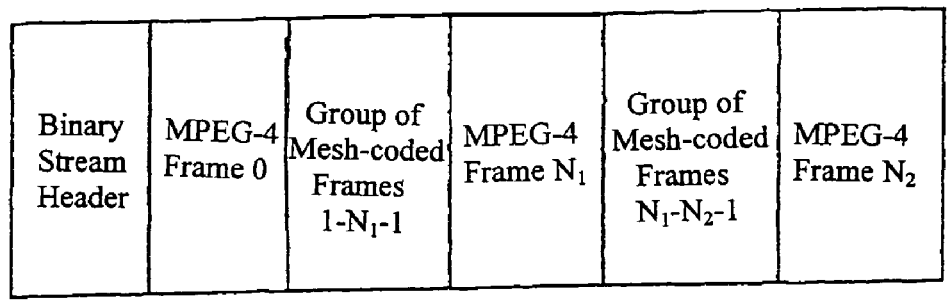
FIG. 9 illustrates the global structure of a binary stream according to the invention.
Figure 10:
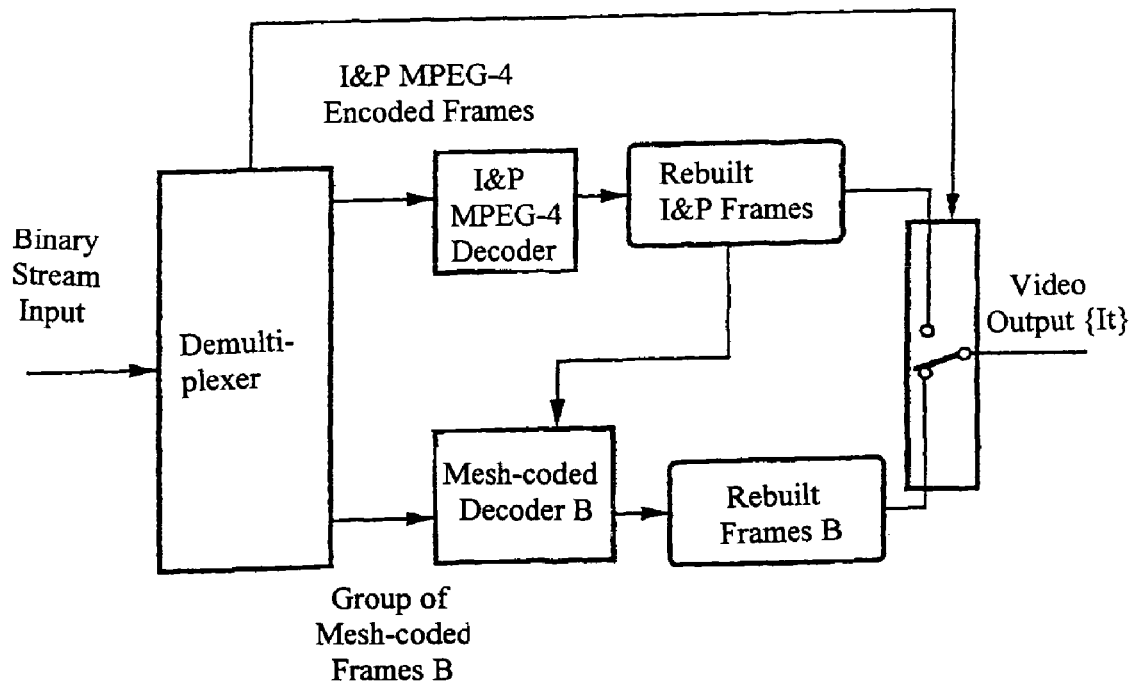
FIG. 10 illustrates a block diagram of a decoder according to the invention.

FIG. 9 provides an overview of the decoding principle.

Firstly, the header decoding allows hybrid decoding to be activated.

Then, the decoder recognises for each part of the binary stream that corresponds to an independent entity if it is a frame encoded in MPEG-4 or a group of frames encoded by meshing.

MPEG-4 frames are provided to the MPEG-4 decoding module, and the groups of frames encoded in meshing mode are provided to the decoding module through meshing.

7.1 Meshing-based Decoding

Firstly, the $T^b_k$ and $T^f_{(k+1)}$ movement meshings for the $I_1$, $N_k<1<N_{k+1}$ image group are decoded.

Next, the blanking areas for these images are found according to the same procedure as in the encoder.

Then, the pixels outside the blanking areas are simply interpolated using the $I_{Nk}$ and $I_{Nk+1}$ images and the $T^b_k$ and $T^f_{k+1}$ movement fields.

Meshing of the thickest texture (top of the hierarchy) is found for each blanking area according to a procedure that is identical to that of the encoder procedure.

The information related to the corresponding hierarchical meshing (triangle division indicator, affine interpolation decisions or DCT encoding, differential nodal YUV values and quantified DCT coefficients) is therefore decoded and the pixel YUV values of these areas are regenerated.

The invention claimed is:

1. An image encoding method, characterised by the following steps:

selecting two images, split by series of at least one image that has to be undersampled;

coding the images delimiting said series of images through a first image encoding, optimizing significantly a photometric representation of an image said first image encoding implementing a transformation on image blocks and a temporal prediction by blocks;

coding each image of the series of images through a second image encoding optimizing a representation of motion between at least two images, said second encoding taking into account of at least one of:

a motion vector field calculated from an immediately preceding image encoded using said first encoding, a motion vector field calculated from an immediately subsequent image encoded using said first encoding, said second encoding relying on the implementation of a mesh made up of nodes enabling to detect non predictable areas in the series of images, such that:

said mesh is used to process the non-predictable areas;

said motion vector field is applied to said mesh and is used to determine a deduced motion vector field, related to an image encoded using said second encoding, so that each image is coded according to only one encoding mode, and wherein said second encoding implements a forward motion estimation, between an image $I_{t1}$ and a subsequent image $I_{t2}$, and a step of motion compensation in which motion vectors obtained during said motion estimation and not leading to reversal are weighted by a scalar k=m(t1+t2), 0<k<1, in order to interpolate at least one image Im of the series, with m the index of the image in the series, m belonging to [t1, t2], delivering an estimated image E1.

2. Encoding method as claimed in claim 1, wherein a piece of information representing a choice of one of said first or second encoding is known by a decoder according to at least one of the techniques belonging to the group comprising:

a predefined choice, known at the encoding and decoding levels;

a piece of information representing said choice and included in a data flow comprising at least some encoded image data;

a piece of information representing said choice and included in a data flow regardless encoded image data;

determining said choice in an intrinsic manner, by the decoder.

3. Encoding method as claimed in claim 1, wherein it comprises a step of selecting an encoding mode to be applied to said image, among which at least:

the first encoding substantially optimising a photometric representation of an image the second encoding substantially optimising a representation of motion between at least two images.

4. Encoding method as claimed in claim 1, wherein said second encoding implements a backward motion estimation, between image $I_{t2}$ and preceding image $I_{t1}$, and a step of motion compensation in which the motion vectors obtained during said motion estimation and not leading to reversal are weighted by a scalar k'=1−m/(t1+t2), 0≦k'≦1 in order to interpolate at least one image Im of the series, with m the index of the image in the series, with m belonging to [t1, t2], delivering an estimated image E2, and wherein it implements the backward motion estimation and the forward motion estimation, in order to obtain an estimated image Im such as Im=aE1+(1−a)E2 with 0≦a≦1.

5. Encoding method as claimed in claim 3, wherein said selection phase is based on the implementation of an N fixed factor subsampling, one image in N being encoded using said first encoding.

6. Encoding method as claimed in claim 5, wherein N is greater than 2.

7. Encoding method as claimed in claim 5, wherein N is variable.

8. Encoding method as claimed in claim 1, wherein said first encoding is an MPEG-4 or H26L encoding.

9. Encoding method as claimed in claim 8, wherein images obtained by said MPEG-4 or H26L encoding comprise type I (intra) and/or type P (predictable) images.

10. Encoding method as claimed in claim 3, wherein said second encoding is based on an M level hierarchical meshing, M being greater than or equal to 1.

11. Encoding method as claimed in claim 10, wherein said meshing is triangular.

12. Encoding method as claimed in claim 1, wherein it produces at least two data flows that can be transmitted over separate transmission paths.

13. Encoding method as claimed in claim 12, wherein said data flows belong to a group comprising:

a global header;

image data encoded according to said first encoding;

image data encoded according to said second encoding.

14. Method for decoding an image signal comprising images encoded using a first encoding and images encoded using a second encoding, said first encoding optimizing significantly a photometric representation of an image, and implementing a transformation on image blocks and a temporal prediction by blocks;

said second encoding optimizing a representation of motion between at least two images, an image $I_{t1}$ and a subsequent image $I_{t2}$, and taking into account of at least one of:

a motion vector field calculated from an immediately preceding image encoded using said first encoding, a motion vector field calculated from an immediately subsequent image encoded using said first encoding, said second encoding relying on implementation of a mesh made up of nodes enabling to detect non predictable areas in the series of images, such that:

said mesh is used to process the non-predictable areas;

said motion vector field is applied to said mesh and is used to determine a deduced motion vector field, related to an image encoded using said second encoding, characterized in that the method of decoding comprises the following steps:

decoding a global header;

decoding the images encoded using the first encoding;

decoding the images encoded using the second encoding, wherein said second encoding implements a forward motion estimation, between image In and subsequent image $I_{t2}$, and a step of motion compensation in which motion vectors obtained during said motion estimation and not leading to reversal are weighted by a scalar k=m/(t1+t2), 0<k<1, in order to interpolate at least one image Im of the series, with m the index of the image in the series, m belonging to [t1, t2], delivering an estimated image E1.

15. An image encoding device, comprising means for:

selecting two images, split by series of at least one image that has to be undersampled;

coding said images delimiting said series of images through a first image encoding, optimizing significantly a photometric representation of an image: said first image encoding implementing a transformation on image blocks and a temporal prediction by blocks;

coding each image of the series of images through a second image encoding optimizing a representation of motion between at least two images, said second encoding taking into account of at least one of:

a motion vector field calculated from an immediately preceding image encoded using said first encoding, a motion vector field calculated from an immediately subsequent image encoded using said first encoding, said second encoding relying on the implementation of a mesh made up of nodes enabling to detect non predictable areas in the series of images, such that:

said mesh is used to process the non-predictable areas;

said motion vector field is applied to said mesh and is used to determine a deduced motion vector field, related to an image encoded using said second encoding, so that each image is coded according to only one coding mode and wherein said second encoding implements a forward motion estimation, between an image $I_{t1}$ and a subsequent image $I_{t2}$, and a step of motion compensation in which motion vectors obtained during said motion estimation and not leading to reversal are weighted by a scalar $k=m/(t1+t2)$, $0<k<1$, in order to interpolate at least one image Im of the series, with m the index of the image in the series, m belonging to [t1, t2], delivering an estimated image E1.

16. Device for decoding an image signal comprising images encoded using a first encoding and images encoded using a second encoding, said first encoding optimizing significantly a photometric representation of an image, and implementing a transformation on image blocks and a temporal prediction by blocks;

said second encoding optimizing a representation of motion between at least two images, and taking into account of at least one of:
  a motion vector field calculated from an immediately preceding image encoded using said first encoding,
  a motion vector field calculated from an immediately subsequent image encoded using said first encoding, said second encoding relying on the implementation of a mesh made up of nodes enabling to detect non predictable areas in the series of images, such that:
  said mesh is used to process the non-predictable areas;
  said motion vector field is applied to said mesh and is used to determine a deduced motion vector field, related to an image encoded using said second encoding, characterized in that the device comprises means for:
  decoding a global header;
  decoding the images encoded using the first encoding;
  decoding the images encoded using the second encoding, wherein said second encoding implements a forward motion estimation, between an image $I_{t1}$ and a subsequent image $I_{t2}$, and a step of motion compensation in which motion vectors obtained during said motion estimation and not leading to reversal are weighted by a scalar $k=m/(t1+t2)$, $0<k<1$, in order to interpolate at least one image Im of the series, with m the index of the image in the series, m belonging to [t1, t2], delivering an estimated image E1.

17. Decoding device as claimed in claim 16, wherein it comprises means for determining at least one part of a vector field and/or at least one part of occlusion areas, similar to those implemented during encoding.

18. Encoding method as claimed in claim 1 wherein said images belong to at least one signal of a group comprising:
  digital TV signal;
  a video signal diffused in real-time video over IP network;
  a video signal diffused in real-time video over network to mobiles;
  a data signal of images intended to be stored on a data storage.

19. Encoding method according to claim 1, wherein the process of non-preditable areas implements the following steps:
  prediction with one of the images delimiting said series of images, or one of these images delimiting said series of images motion compensated with their motion fields, without motion compensation;
  encoding the prediction error with a meshing-based technique.

20. Encoding method according to claim 1, wherein the process of non-preditable areas implements the following steps:
  prediction with one of the images delimiting said series of images, or one of these images delimiting said series of images motion compensated with their motion fields, with intra-image motion compensation,
  encoding the prediction error with a meshing-based technique.

21. Encoding method according to claim 1, wherein the process of non-preditable areas implements an intra-image encoding based on a meshing-based technique.

22. An image encoding method, characterised by the following steps:
  selecting two images, split by series of at least one image that has to be undersampled;
  coding said images delimiting said series of images through a first image encoding, optimizing significantly a photometric representation of an image said first image encoding implementing a transformation on image blocks and a temporal prediction by blocks;
  coding each image of the series of images through a second image encoding optimizing a representation of motion between at least two images, said second encoding taking into account of at least one of:
    a motion vector field calculated from an immediately preceding image encoded using said first encoding,
    a motion vector field calculated from an immediately subsequent image encoded using said first encoding,
  said second encoding relying on the implementation of a mesh made up of nodes enabling to detect non predictable areas in the series of images, such that:
    said mesh is used to process the non-predictable areas;
    said motion vector field is applied to said mesh and is used to determine a deduced motion vector field, related to an image encoded using said second encoding,
  so that each image is coded according to only one encoding mode, and
  wherein said second encoding implements a backward motion estimation, between image $I_{t2}$ and preceding image $I_{t1}$, and a step of motion compensation in which motion vectors obtained during said motion estimation and not leading to reversal are weighted by a scalar $k'=1-m/(t1+t2)$, $0<k'<1$, in order to interpolate at least one image Im of the series, with m the index of the image in the series, m belonging to [t1, t2], delivering an estimated image E2.

23. Method for decoding an image signal comprising images encoded using a first encoding and images encoded using a second encoding, said first encoding optimizing significantly a photometric representation of an image, and implementing a transformation on image blocks and a temporal prediction by blocks;

said second encoding optimizing a representation of motion between at least two images, an image $I_{t1}$ and a subsequent image $I_{t2}$, and taking into account of at least one of:
  a motion vector field calculated from an immediately preceding image encoded using said first encoding,
  a motion vector field calculated from an immediately subsequent image encoded using said first encoding, said second encoding relying on implementation of a mesh made up of nodes enabling to detect non predictable areas in the series of images, such that:
said mesh is used to process the non-predictable areas;
said motion vector field is applied to said mesh and is used to determine a deduced motion vector field, related to an image encoded using said second encoding, characterized in that the method of decoding comprises the following steps:
decoding a global header;
decoding the images encoded using the first encoding;
decoding the images encoded using the second encoding, wherein said second encoding implements a backward motion estimation, between image $I_{t2}$ and preceding image $I_{t1}$, and a step of motion compensation in which motion vectors obtained during said motion estimation and not leading to reversal are weighted by a scalar k'=1-m/(t1+t2), 0<k'<1, in order to interpolate at least one image Im of the series, with m the index of the image in the series, m belonging to [t1, t2], delivering an estimated image E2.

24. An image encoding device, comprising means for:
selecting two images, split by series of at least one image that has to be undersampled;
coding said images delimiting said series of images through a first image encoding, optimizing significantly a photometric representation of an image said first image encoding implementing a transformation on image blocks and a temporal prediction by blocks;
coding each image of the series of images through a second image encoding optimizing a representation of motion between at least two images, said second encoding taking into account of at least one of:
a motion vector field calculated from an immediately preceding image encoded using said first encoding,
a motion vector field calculated from an immediately subsequent image encoded using said first encoding,
said second encoding relying on the implementation of a mesh made up of nodes enabling to detect non predictable areas in the series of images, such that:
said mesh is used to process the non-predictable areas;
said motion vector field is applied to said mesh and is used to determine a deduced motion vector field, related to an image encoded using said second encoding,
so that each image is coded according to only one coding mode, and
wherein said second encoding implements a backward motion estimation, between image $I_{t2}$ and preceding image $I_{t1}$, and a step of motion compensation in which motion vectors obtained during said motion estimation and not leading to reversal are weighted by a scalar k'=1-m/(t1+t2), 0<k'<1, in order to interpolate at least one image mi of the series, with m the index of the image in the series, m belonging to [t1, t2], delivering an estimated image E2.

25. Device for decoding an image signal comprising images encoded using a first encoding and images encoded using a second encoding,
said first encoding optimizing significantly a photometric representation of an image, and implementing a transformation on image blocks and a temporal prediction by blocks;
said second encoding optimizing a representation of motion between at least two images, an image $I_{t1}$ and a subsequent image $I_{t2}$, and taking into account of at least one of:
a motion vector field calculated from an immediately preceding image encoded using said first encoding,
a motion vector field calculated from an immediately subsequent image encoded using said first encoding,
said second encoding relying on the implementation of a mesh made up of nodes enabling to detect non predictable areas in the series of images, such that:
said mesh is used to process the non-predictable areas;
said motion vector field is applied to said mesh and is used to determine a deduced motion vector field, related to an image encoded using said second encoding,
characterized in that the device comprises means for:
decoding a global header;
decoding the images encoded using the first encoding;
decoding the images encoded using the second encoding, wherein said second encoding implements a backward motion estimation, between image $I_{t2}$ and preceding image $I_{t1}$, and a step of motion compensation in which motion vectors obtained during said motion estimation and not leading to reversal are weighted by a scalar k'=1-m/(t1+t2), 0<k'<1, in order to interpolate at least one image Im of the series, with m the index of the image in the series, m belonging to [t1, t2], delivering an estimated image E2.

* * * * *

UNITED STATES PATENT AND TRADEMARK OFFICE
CERTIFICATE OF CORRECTION

PATENT NO. : 7,512,179 B2  Page 1 of 1
APPLICATION NO. : 10/470316
DATED : March 31, 2009
INVENTOR(S) : Henri Sanson, Alexandre Buisson and Nathalie Laurent-Chatenet It is certified that error appears in the above-identified patent and that said Letters Patent is hereby corrected as shown below:

Col. 13, line 12, change "k=m(t1+t2)" to --k=m/(t1+t2)--.
Col. 14, line 37, change "In" to --$I_{t1}$--.
Col. 14, line 50, change ":" to --,--.
Col. 15, line 6, after "mode" insert --,--.

Signed and Sealed this

Thirteenth Day of October, 2009

David J. Kappos
*Director of the United States Patent and Trademark Office*